United States Patent
Yu (10) Patent No.: US 10,579,696 B2
(45) Date of Patent: Mar. 3, 2020

(54) SAVE SESSION STORAGE SPACE BY IDENTIFYING SIMILAR CONTENTS AND COMPUTING DIFFERENCE

(71) Applicant: International Business Machines Corporation, Armonk, NY (US)

(72) Inventor: Haixiao Yu, Fremont, CA (US)

(73) Assignee: Inernational Business Machines Corporation, Armonk, NY (US)

( * ) Notice: Subject to any disclaimer, the term of this patent is extended or adjusted under 35 U.S.C. 154(b) by 0 days.

(21) Appl. No.: 15/902,428

(22) Filed: Feb. 22, 2018

(65) Prior Publication Data

US 2019/0258742 A1    Aug. 22, 2019

(51) Int. Cl.
| | | |
|---|---|---|
| G06F 15/16 | (2006.01) | |
| G06F 16/955 | (2019.01) | |
| G06F 17/27 | (2006.01) | |
| G06F 17/21 | (2006.01) | |
| G06F 16/958 | (2019.01) | |

(52) U.S. Cl.
CPC ........ *G06F 16/9566* (2019.01); *G06F 16/972* (2019.01); *G06F 17/212* (2013.01); *G06F 17/27* (2013.01)

(58) Field of Classification Search
USPC ....... 709/203, 206, 217, 219, 223, 224, 226, 709/228, 230, 232, 238; 707/710; 705/59
See application file for complete search history.

(56) References Cited

U.S. PATENT DOCUMENTS

| | | |
|---|---|---|
| 7,370,329 B2 | 5/2008 | Kumar et al. |
| 8,001,215 B2 | 8/2011 | Dominowska et al. |
| 8,055,998 B2 | 11/2011 | Kashioka |
| 8,700,639 B1 | 4/2014 | Datar et al. |
| 9,413,840 B2 | 8/2016 | Taylor et al. |
| 9,479,613 B2 | 10/2016 | Harvey et al. |
| 2008/0016225 A1 | 1/2008 | Malik |
| 2011/0004555 A1* | 1/2011 | Onda ...................... G06F 21/10 705/59 |
| 2012/0054295 A1 | 3/2012 | Cai et al. |
| 2014/0040487 A1 | 2/2014 | Galchev |
| 2015/0379143 A1* | 12/2015 | Niu ....................... G06F 3/0482 707/710 |
| 2017/0251081 A1* | 8/2017 | Roychowdhury ...... H04L 67/02 |
| 2017/0344638 A1* | 11/2017 | Laperi ................... G06F 16/951 |

\* cited by examiner

*Primary Examiner* — Quang N Nguyen
(74) *Attorney, Agent, or Firm* — VanLeeuwen & VanLeeuwen; Christopher M. Pignato (57) ABSTRACT

An approach is provided in which an information handling system begins by storing a first URL and a corresponding first web page dataset. The information handling system then receives a request to store a second URL and a corresponding second web page dataset. The information handling system determines that the second URL corresponds to the first URL and, as such, the information handling system creates a diff web page dataset based on a difference between the first web page dataset and the second web page dataset. In turn, the information handling system stores the second URL and the diff web page dataset.

20 Claims, 9 Drawing Sheets

FIG. 9 ts ingly; to 25 dataset or a diff web page dataset;
SAVE SESSION STORAGE SPACE BY IDENTIFYING SIMILAR CONTENTS AND COMPUTING DIFFERENCE

BACKGROUND

Software as a service (SaaS)-based analytics solutions for web and mobile applications assist users in understanding and improving overall customer experiences by analyzing behavioral problems from large and complex online data sets. SaaS systems may analyze user behaviors by capturing application interactions, device information, and user context between a user and a host, such as when a user views and inputs information on the host's website.

During a mobile session, a user may send several requests, selections, etc. to the host system to access different webpages at the host. For each of these user requests, the host system sends instructions to its corresponding SaaS to store information such as requested URLs (uniform resource locator) and the requested data (e.g., web page). As a result, SaaS systems may store a large amount of data for each mobile session.

As the number of mobile devices in circulation increases, as well as their user friendliness, the amount of mobile sessions increases and, in turn, the amount of data that today's SaaS systems are required to store, and its corresponding storage cost, becomes extraordinarily large.

BRIEF SUMMARY

According to one embodiment of the present disclosure, an approach is provided in which an information handling system begins by storing a first URL and a corresponding first web page dataset. The information handling system then receives a request to store a second URL and a corresponding second web page dataset. The information handling system determines that the second URL corresponds to the first URL and, as such, the information handling system creates a diff web page dataset based on a difference between the first web page dataset and the second web page dataset. In turn, the information handling system stores the second URL and the diff web page dataset.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

According to an aspect of the present invention there is a method, system and/or computer program product that performs the following operations (not necessarily in the following order): (i) storing a first URL and a corresponding first web page dataset; (ii) receiving a request to store a second URL and a corresponding second web page dataset; (iii) in response to determining that the second URL matches the first URL, creating a diff web page dataset based on a difference between the first web page dataset and the second web page dataset; and (iv) storing the second URL and the diff web page dataset.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein.

DETAILED DESCRIPTION

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The following detailed description will generally follow the summary of the disclosure, as set forth above, further explaining and expanding the definitions of the various aspects and embodiments of the disclosure as necessary.

Figure 1:
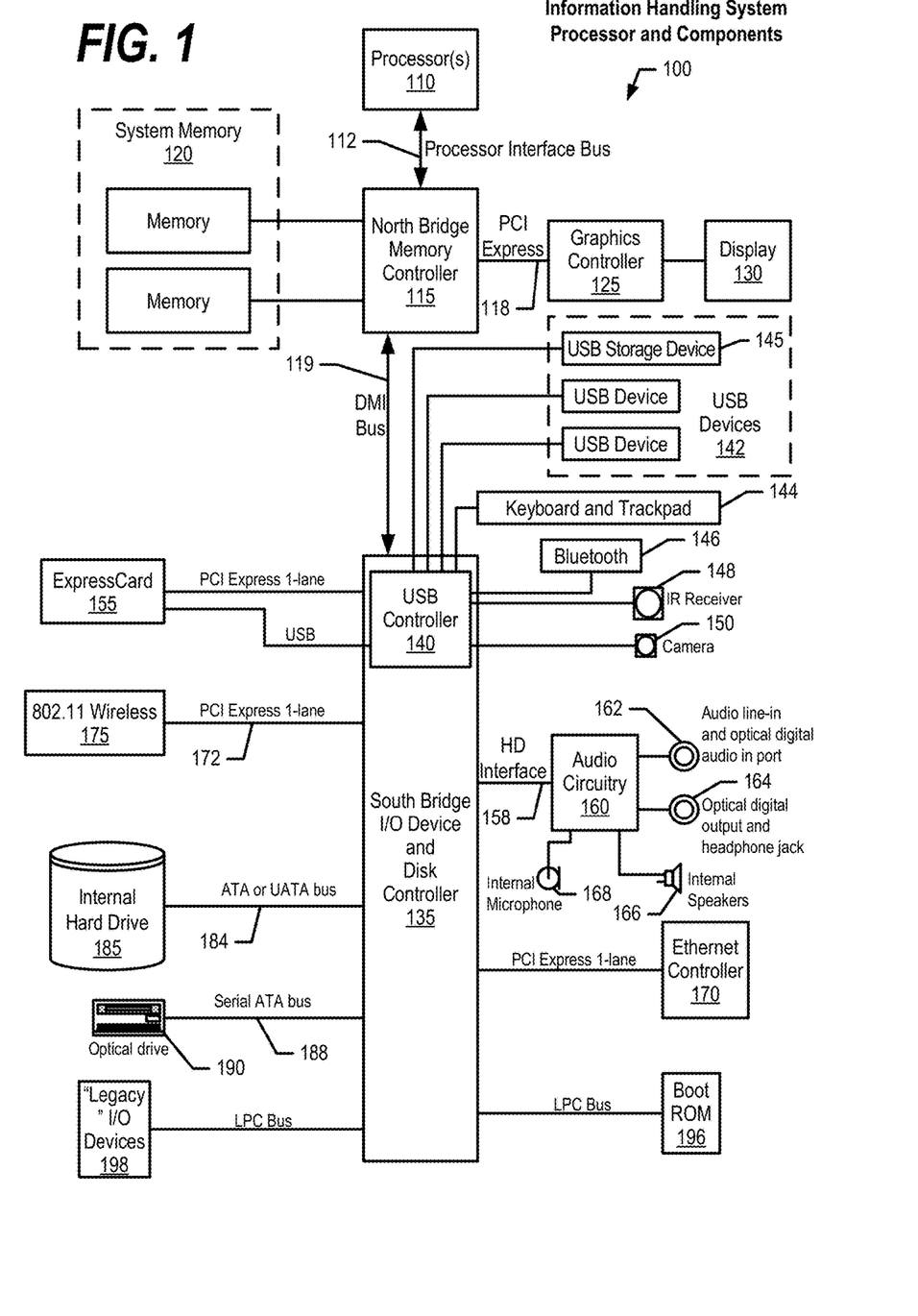
FIG. 1 is a block diagram of a data processing system in which the methods described herein can be implemented.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, Peripheral Component Interconnect (PCI) Express bus 118 connects Northbridge 115 to graphics controller 125. Graphics controller 125 connects to display device 130, such as a computer monitor.

Northbridge 115 and Southbridge 135 connect to each other using bus 119. In some embodiments, the bus is a Direct Media Interface (DMI) bus that transfers data at high speeds in each direction between Northbridge 115 and Southbridge 135. In some embodiments, a PCI bus connects the Northbridge and the Southbridge. Southbridge 135, also known as the Input/Output (I/O) Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and Universal Serial Bus (USB) connectivity as it connects to Southbridge 135 using both the USB and the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, Integrated Services Digital Network (ISDN) connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the Institute of Electrical and Electronic Engineers (IEEE) 802.11 standards of over-the-air modulation techniques that all use the same protocol to wireless communicate between information handling system 100 and another computer system or device. Optical storage device 190 connects to Southbridge 135 using Serial Analog Telephone Adapter (ATA) (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality associated with audio hardware such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, Automated Teller Machine (ATM), a portable telephone device, a communication device or other devices that include a processor and memory.

Figure 2:
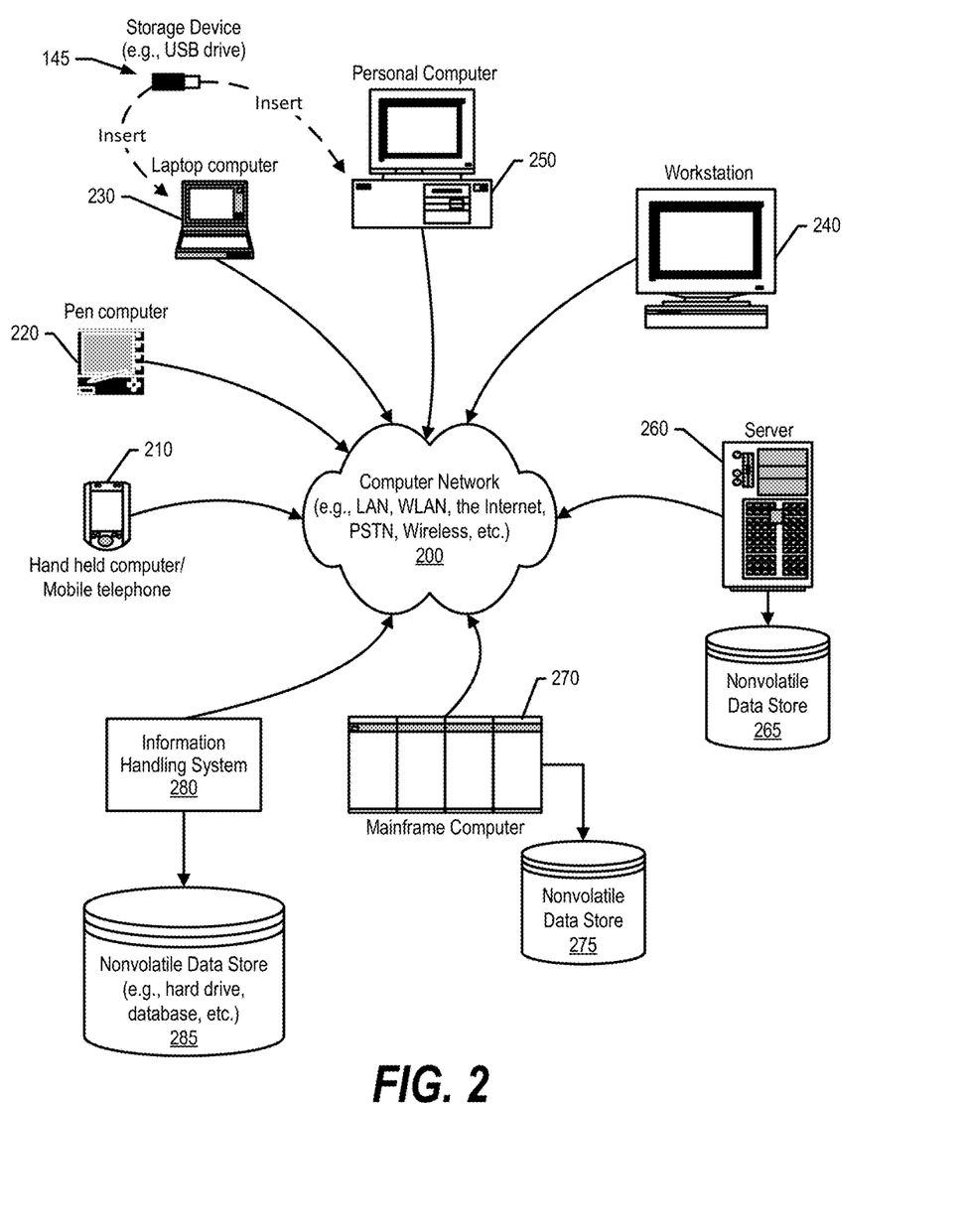
FIG. 2 provides an extension of the information handling system environment shown in FIG. 1 to illustrate that the methods described herein can be performed on a wide variety of information handling systems which operate in a networked environment.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as Moving Picture Experts Group Layer-3 Audio (MP3) players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. The embodiment of the information handling system shown in FIG. 2 includes separate nonvolatile data stores (more specifically, server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

As discussed above, today's SaaS systems are required to store an extraordinary amount of data for behavioral analysis and recovery. FIGS. 3 through 9 depict an approach that can be executed on an information handling system to reduce the overall amount of data storage requirements in a SaaS cloud-based system. As defined herein, the term "web page dataset" is any set of data representing a web page as it exists when browsed during a browser session. The web page dataset may be: (i) expressed as a markup language file, (ii) a document object model, (III) a document object model instance, or (iv) any way of representing web pages now known or to be developed in the future.

The information handling system receives a request by a host system and stores a first web page dataset with a corresponding first URL. When the information handling system receives a request to store a second web page dataset with a second URL, the information handling system first compares the second URL with the first URL and, when the second URL matches or is similar to the first URL, the information handling system computes web page dataset difference data (diff web page dataset) based on the first web page dataset and the second web page dataset. In turn, the information handling system stores the diff web page dataset and a pointer to the first web page dataset (base web page dataset), thus reducing the amount of data to be stored for the second web page dataset. In short, the information handling system efficiently identifies similar web page datasets without comparing the actual data by matching corresponding URL's occurring on the same day. Then, the information handling system stores diff web page datasets for similar web page datasets instead of a complete web page dataset, thus reducing overall storage requirements and costs.

In one embodiment, before computing a diff web page dataset, the information handling system pre-processes the base web page dataset (first web page dataset) and the new web page dataset (second web page dataset) to remove redundant white spaces, and then uses a word-based suffix tree to find a "longest common string" to compute the difference data.

Figure 3:
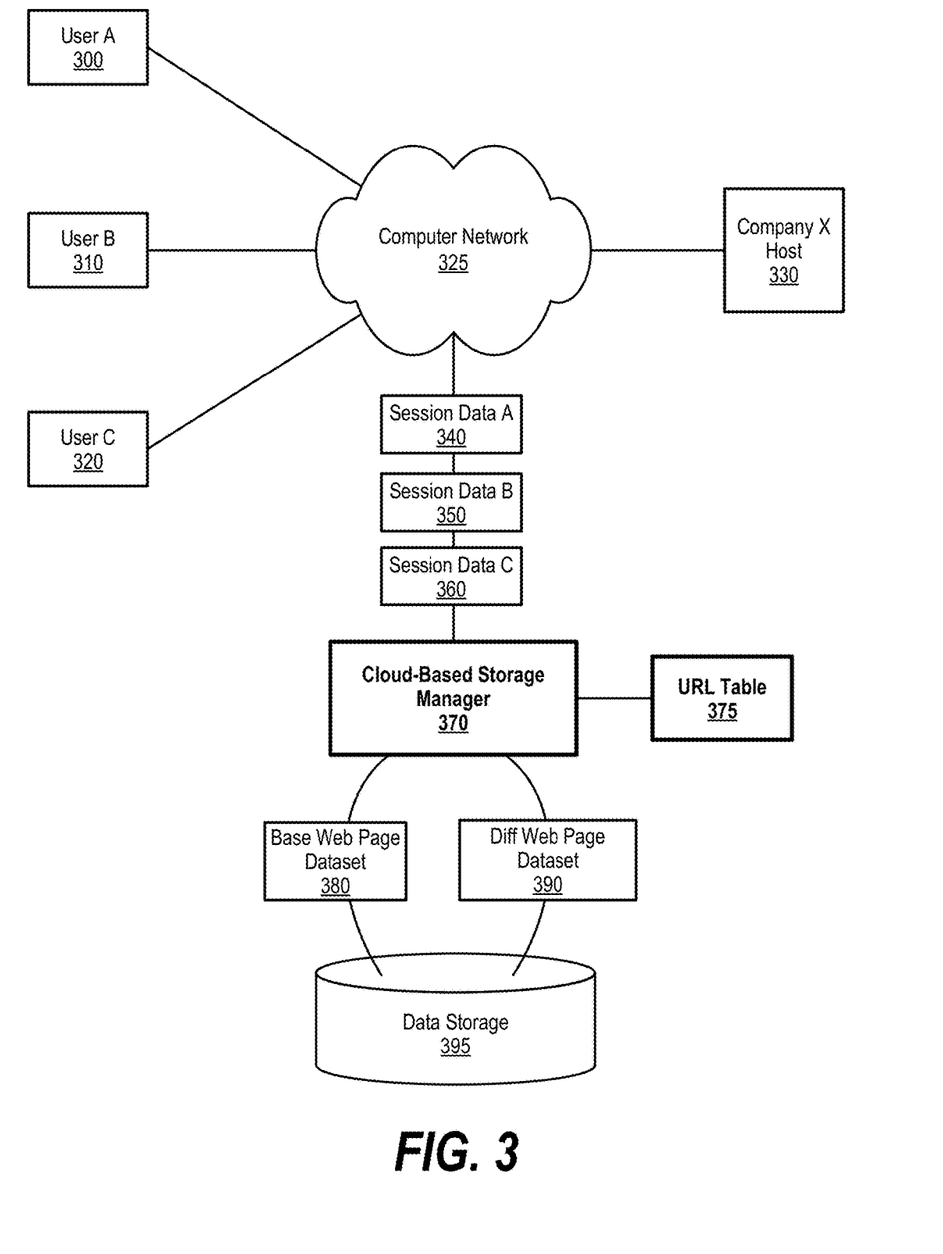
FIG. 3 is an exemplary diagram depicting a cloud-based storage manager identifying similar web page datasets and storing diff web page datasets accordingly.

FIG. 3 is an exemplary diagram depicting a cloud-based storage manager identifying similar web page datasets and storing diff web page datasets accordingly. User A 300, user B 310, and user C 320 access websites hosted by company X host 330 over computer network 325. Company X host 330 forwards session data A 340, B 350, and C 360 of its respective users to cloud-based storage manager 370 to store as part of its SaaS agreement. As defined herein, session data includes URL's, web page datasets, and user input/activity. Meaning, when a user types on a page or clicks on a page, the typing and clicks are part of the session data. For example, when a user types a name "John" on the page, "John" is part of the session data and, when the user clicks on an html element on the page, the click is also part of the session data. In one embodiment, the user input/activity is reflected in the web page dataset that is captured. For example, an original web page dataset may include <input type="text" name="fname">, and after the user types "John", the web page dataset captured would be <input type="text" name="fname" value="john">.

Assuming cloud-based storage manager 370 receives session data A 340 first, cloud-based storage manager 370 analyzes the first URL in session data A 340 and determines that cloud-based storage manager 370 does not have any matching URLs stored in URL table 375. Cloud-based storage manager 370 then stores the first URL and a web page dataset corresponding to the first URL as base web page dataset 380 in data storage 395 (see FIG. 4 and corresponding text for further details). As cloud-based storage manager 370 receives new URL/web page dataset combinations, from user A 300's session, user B 310's session, and/or user C 320's session, cloud-based storage manager 370 compares the new URLs with the stored URLs in URL table 375 to find a match or a similar URL (discussed below).

In one embodiment, cloud-based storage manager 370 searches for matching URL's that are requested on the same day to have a higher confidence level that the web page datasets are similar without actually comparing the web page datasets. For example, if user A 300 visits www.companyX.com's home page on different days, the user may see significant differences, especially around holidays where Company X runs different ad campaigns on different days and may lead to very different web page presentations.

In another embodiment, cloud-based storage manager 370 identifies matching or similar URLs by optimizing around search queries because search query results may be the same even if their word orders are different. For example, user A 300 may search for "red socks" on company X host 330, which results in "https://www.companyX.com/s/red-red-socks/N-135?Ntt=red %20socks." User B 310 may then search for "socks red" on company X host 300, which results in "https://www.storeA.com/s/red-socks-red/N-135?Ntt=socks %20red." Even though the URL's are technically different, the content included in the two resulting webpages are similar if not the same. In this example, the information handling system receives two queries "Ntt=red %20socks" and "Ntt=socks %20red" in the session data (e.g., part of the URLs). The information handling system normalizes the queries to "red socks" and "socks red" and re-sorts them with words (e.g., alphabetically), both of which become "red socks."

When cloud-based storage manager 370 finds a match between a new URL and a stored URL, cloud-based storage manager 370 analyzes the stored web page dataset corresponding to the stored URL (base web page dataset 380) against the new web page dataset corresponds to the new URL and computes a diff web page dataset (difference data). The diff web page dataset is the "difference" between the base web page dataset and the new web page dataset (see FIGS. 6, 9, and corresponding text for further details). In turn, cloud-based storage manager 370 stores diff web page dataset 390 in data storage 395, which includes a link to the base web page dataset along with the differences between the base web page dataset and the new web page dataset (see FIG. 9 and corresponding text for further details). When cloud-based storage manager 370 is requested to reconstruct the new web page dataset, cloud-based storage manager 370 retrieves the base web page dataset and applies the differences to the base web page dataset (see FIG. 7 and corresponding text for further details).

Figure 4:
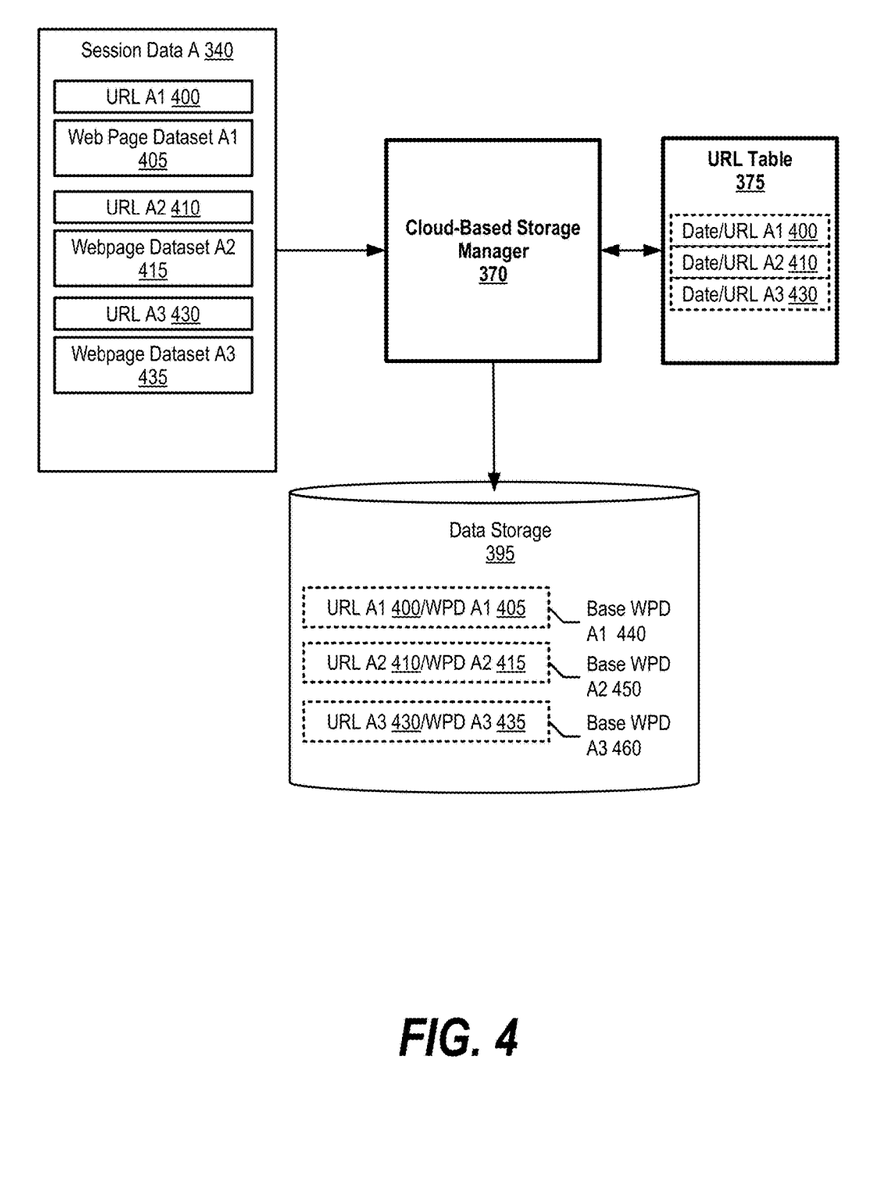
FIG. 4 is an exemplary diagram depicting a cloud-based storage manager storing session data corresponding to a user session.

FIG. 4 is an exemplary diagram depicting a cloud-based storage manager storing session data corresponding to a user session. Cloud-based storage manager 370 receives session data A 340 and analyzes URL A1 400 against URLs stored in URL table 375. Cloud-based storage manager 370 does not find a matching URL and, in turn stores URL A1 400 with a timestamp (date) in URL table 375. Then, because of no matching URLs, cloud-based storage manager 370 stores web page dataset A1 405 with URL A1 400 as base web page dataset 440. In one embodiment, cloud-based storage manager 370 stores web page dataset 405 as a stand-alone base web page dataset without URL A1 400.

Similarly, cloud-based storage manager 370 compares URL A2 410 against URLs stored in URL table 375 and does not find a match. In turn, cloud-based storage manager 370 stores URL A2 410 with a timestamp in URL table 375, and stores web page dataset A2 415 with URL A2 410 as base web page dataset 450 in data storage 395. Cloud-based storage manager 370 also compares URL A3 430 against URLs stored in URL table 375 and does not find a match. In turn, cloud-based storage manager 370 stores URL A3 430 with a timestamp in URL table 375, and stores web page dataset A3 435 with URL A3 430 as base web page dataset 460 in data storage 395. When cloud-based storage manager 370 receives subsequent session data, cloud-based storage manager 370 compares their included URLs with the URLs stored in URL table 375 to determine whether matching or similar URLs exist (see FIG. 5 and corresponding text for further details).

Figure 5:
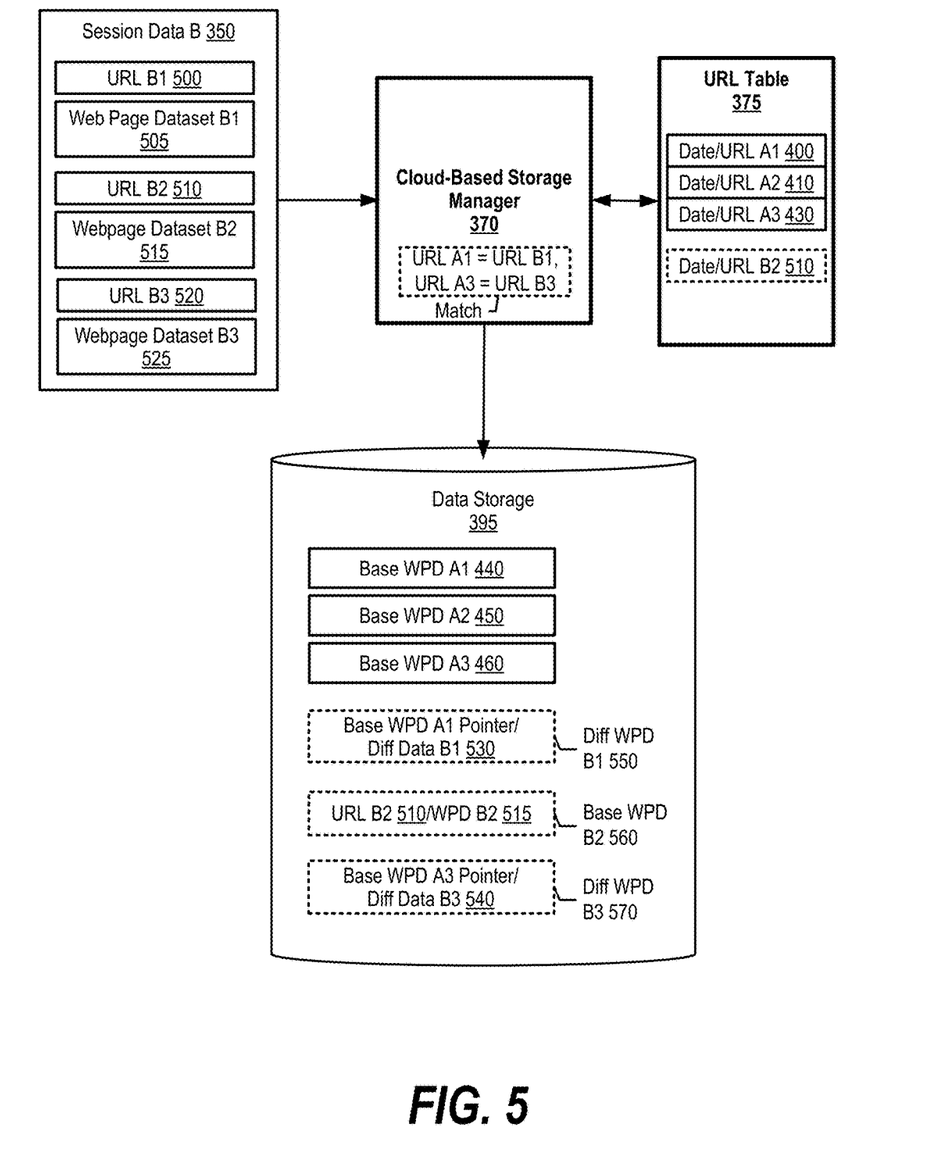
FIG. 5 is an exemplary diagram depicting a cloud-based storage manager comparing web page datasets corresponding to a second user against stored web page datasets and storing diff web page datasets accordingly.

FIG. 5 is an exemplary diagram depicting a cloud-based storage manager comparing web page datasets corresponding to a second user against stored web page datasets and storing diff web page datasets accordingly.

URL table 375 includes three URLs stored by cloud-based storage manager 370 based on processing session data A 340 from FIG. 4. Cloud-based storage manager 370 then receives session data B 350 and compares URL B1 500 against the stored URLs. Cloud-based storage manager 370 determines that URL B1 500 matches or is similar to URL A1 400 using approaches discussed herein. As such, cloud-based storage manager 370 identifies base web page dataset A1 440 and compares base web page dataset A1 440 with web page dataset B1 505. In one embodiment, cloud-based storage manager 370 pre-processes both web page dataset to remove white space and also constructs a word-based suffix tree to determine differences between the two web page datasets (see FIGS. 6, 8, and corresponding text for further details). Cloud-based storage manager 370 stores the determined difference data 530 along with a pointer to base web page dataset A1 440 as diff web page dataset B1 550.

Cloud-based storage manager 370 then compares URL B2 510 with URLs stored in URL table 375 and does not find a matching or similar URL. As a result, cloud-based storage manager 370 stores URL B2 510 with a timestamp in URL table 375 and also stores its corresponding web page dataset B2 515 with URL B2 510 as base web page dataset B2 560 in data storage 395.

When cloud-based storage manager 370 compares URL B3 520 with the stored URLs in URL table 375, cloud-based storage manager 370 determines that URL B3 520 matches or is similar to URL A3 430. As such, cloud-based storage manager 370 identifies base web page dataset A3 460 and compares base web page dataset A3 460 with web page dataset B3 525. Cloud-based storage manager 370 stores the determined difference data 540 along with a pointer to base web page dataset A3 460 as diff web page dataset B3 570.

Figure 6:
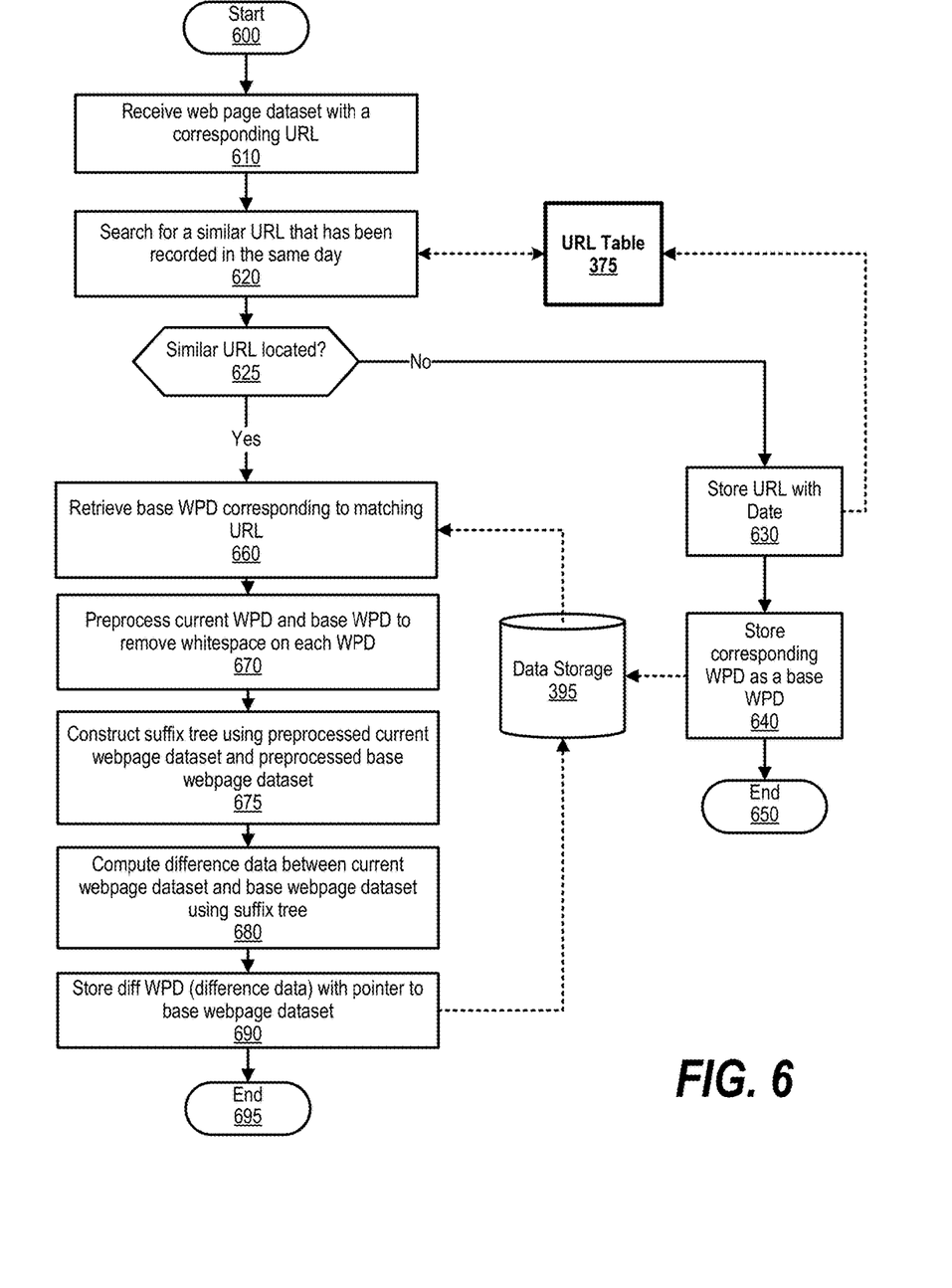
FIG. 6 is an exemplary flowchart showing steps taken to analyze newly received URL's against stored URLs and store corresponding web page dataset information accordingly.

FIG. 6 is an exemplary flowchart showing steps taken to analyze newly received URL's against stored URLs and store corresponding web page dataset information accordingly. FIG. 6 processing commences at 600 whereupon, at step 610, the process receives a web page dataset with a corresponding URL. For example, company X host 330 may send cloud-based storage manager 370 a web page dataset and corresponding URL requested by user A 300.

At step 620, the process searches for a matching or similar URL using approaches discussed herein that has been recorded in the same day and stored in URL table 375. The process determines as to whether a similar URL was located (decision 625). If a matching or similar URL was not located, then decision 625 branches to the 'no' branch whereupon, at step 630, the process stores the received URL with a date (timestamp) in URL table 375. The URL is stored with the date so subsequent URLs are compared with URLs received on the same date for reasons discussed herein. At step 640, the process stores the corresponding web page dataset and URL combination as a base web page dataset in data storage 395 and FIG. 6 processing thereafter ends at 650.

On the other hand, if a matching or similar URL was located in URL table 375, then decision 625 branches to the 'yes' branch. At step 660, the process retrieves a stored web page dataset (base web page dataset) corresponding to the matching URL from data storage 395 and, at step 670, the process pre-processes the new web page dataset and base web page dataset to remove whitespace on each web page dataset.

Figure 8:
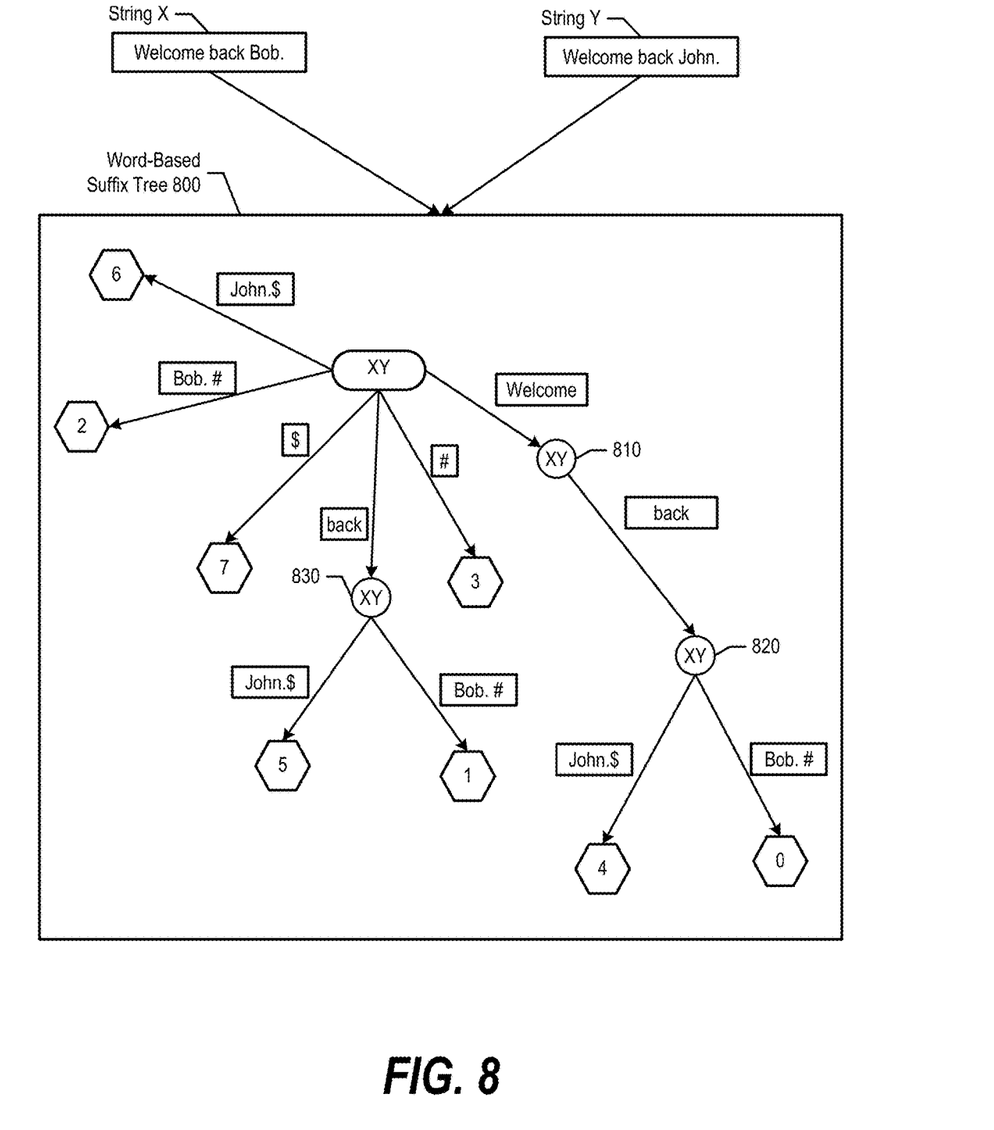
FIG. 8 is an exemplary diagram depicting a word-based suffix tree generated by a cloud-based storage manager to determine differences between two web page datasets.

At step 675, the process constructs a word-based suffix tree using the pre-processed current webpage dataset and pre-processed base webpage dataset (see FIG. 8 and corresponding text for further details). At step 680, the process computes a difference (difference data) between current webpage dataset and base webpage dataset based on a longest common string found in the word-based suffix tree. At step 690, the process stores the difference data and a pointer to the base web page dataset as a diff web page dataset in data storage 395 (see FIG. 9, diff web page dataset 920 and corresponding text for further details). FIG. 6 processing thereafter ends at 695.

Figure 7:
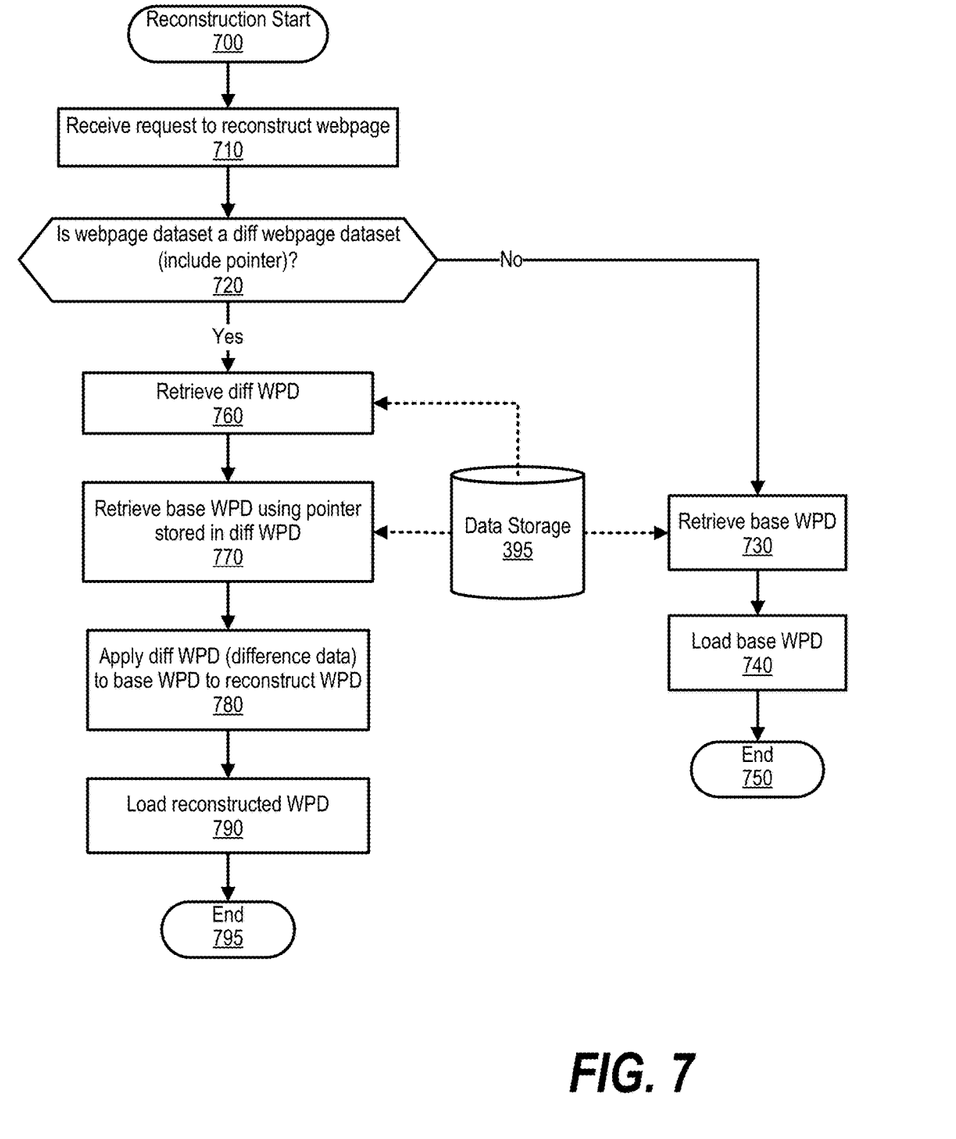
FIG. 7 is an exemplary flowchart showing steps taken to reconstruct a web page dataset from either a base web page dataset or a diff web page dataset.

FIG. 7 is an exemplary flowchart showing steps taken to reconstruct a web page dataset from either a base web page dataset or a diff web page dataset. FIG. 7 processing commences at 700 whereupon, at step 710, the process receives a request to reconstruct a webpage. The process determines as to whether the requested web page dataset is a base web page dataset or a diff web page dataset, such as by checking if the web page dataset includes a pointer to a base web page dataset (decision 720).

If the web page dataset is not a diff web page dataset, but rather a base web page dataset, then decision 720 branches to the 'no' branch. At step 730, the process retrieves the base web page dataset from data storage 395 and, at step 740, the process loads the base web page dataset. FIG. 7 processing thereafter ends at 750.

However, if the requested web page dataset is a diff web page dataset, then decision 720 branches to the 'yes' branch. At step 760, the process retrieves the diff web page dataset and, at step 770, the process uses the pointer in the diff web page dataset to retrieve the base web page dataset from data storage 395. At step 780, the process applies the difference data in the diff web page dataset to the base web page dataset to reconstruct the web page dataset and, at step 790, the process loads the reconstructed web page dataset (base web page dataset with the applied difference data). FIG. 7 processing thereafter ends at 795.

FIG. 8 is an exemplary diagram depicting a word-based suffix tree generated by a cloud-based storage manager to determine differences between two web page datasets. Cloud-based storage manager 370 constructs word-based suffix tree 800 from string X (e.g. from a base web page dataset) and string Y (e.g., from a newly received web page dataset). String X is "Welcome back Bob." and string Y is "Welcome back John."

Cloud-based storage manager 370 first concatenates the two strings to "Welcome back Bob.#" and "Welcome back John.$" where # and $ are used to mark of the end of string. Cloud-based storage manager 370 then generates tree 800 with eight suffixes:

0: Welcome back Bob. #
1: back Bob. #
2: Bob. #
3: #
4: Welcome back John. $
5: back John. $
6: John. $
7: $ Cloud-based storage manager 370 analyzes word-based suffix tree 800 and determines that some internal nodes have lower leaves from both string X and string Y, which are marked as "XY" 810, 820, and 830 in FIG. 8. The deepest XY node 820 in tree 800 has path label "Welcome back"

from root to that node, which is the longest common string of X and Y. Once cloud-based storage manager 370 determines the longest common string, cloud-based storage manager 370 identifies the left and right side of the longest common string from both string X and Y.

By recursively applying the algorithm, cloud-based storage manager 370 identifies all of the common strings and the remaining strings are the difference. Word-based suffix tree 800 shows that the left side of "Welcome back" is empty, so it stops. The right side becomes "Bob." and "John," and cloud-based storage manager 370 applies the same algorithm to "Bob." and "John." In turn, cloud-based storage manager 370 determines that there is no common string found, so cloud-based storage manager 370 determines that "Bob." and "John." are the difference and stores the results in a diff web page dataset (see FIG. 9 and corresponding text for further details).

Figure 9:
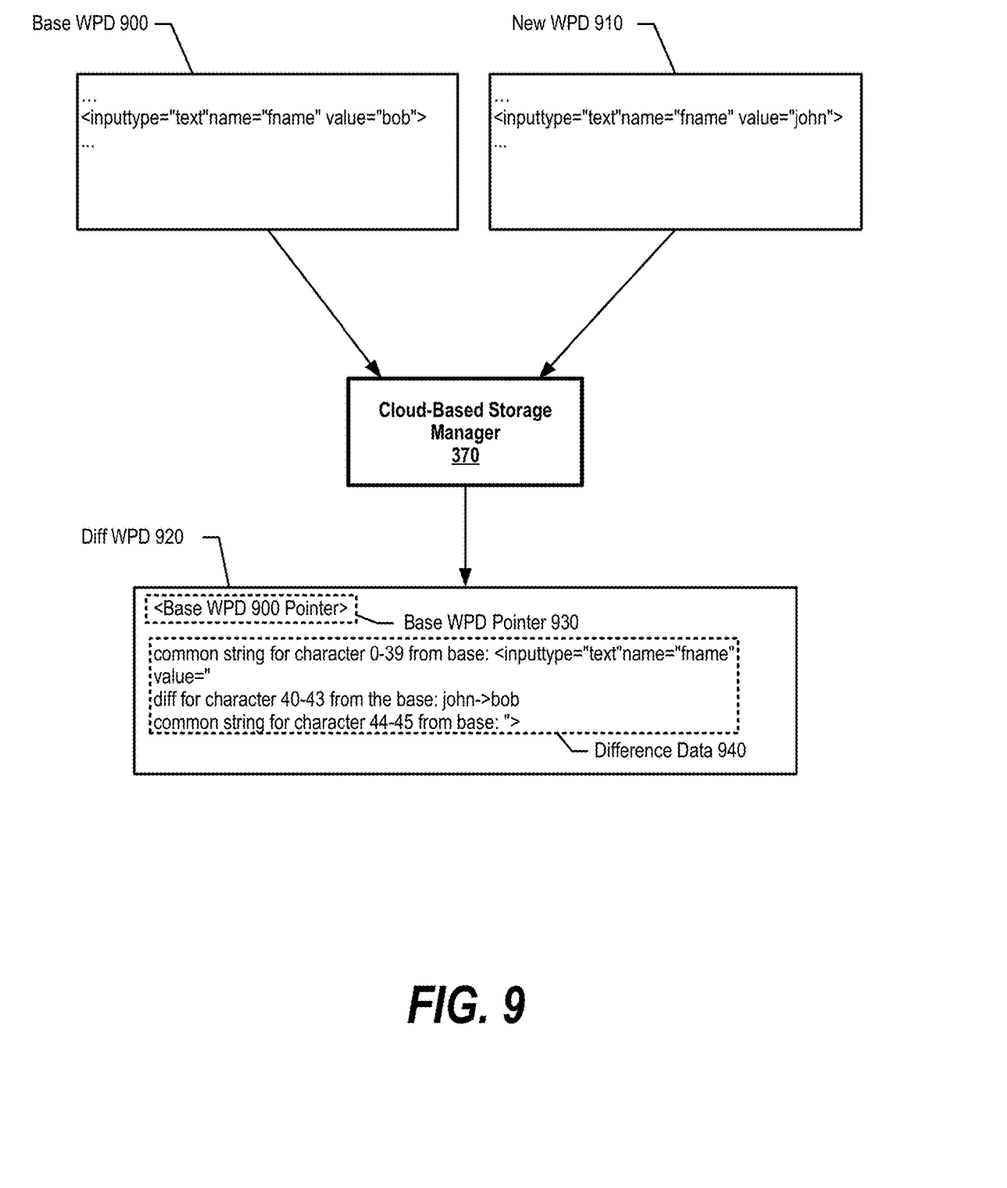
FIG. 9 is an exemplary diagram depicting a cloud-based storage manager generating a diff web page dataset with a corresponding base web page dataset pointer.

FIG. 9 is an exemplary diagram depicting a cloud-based storage manager generating a diff web page dataset with a corresponding base web page dataset pointer. Base web page dataset 900 includes the string <inputtype="text"name="fname" value="bob"> and new web page dataset 910 includes the string <inputtype="text"name="fname" value="john">. Once cloud-based storage manager 370 determines that their corresponding URLs match or are similar, cloud-based storage manager 370 computes the difference between base web page dataset 900 and current web page dataset 910 and stores the difference as difference data 940 in diff web page dataset 920. In addition, as discussed herein, cloud-based storage manager 370 stores base web page dataset pointer 930 in diff web page dataset that points back to base web page dataset 900.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A method implemented by an information handling system that includes a memory and a processor, the method comprising:
storing a first URL and a corresponding first web page dataset;
receiving a request to store a second URL and a corresponding second web page dataset;
in response to determining that the second URL corresponds to the first URL, creating a diff web page dataset based on a difference between the first web page dataset and the second web page dataset, wherein the creating of the diff web page dataset further comprises:
creating a word-based suffix tree based on the first web page dataset and the second web page dataset; and
using the word-based suffix tree in the determining of the difference between the first web page dataset and the second web page dataset; and
storing the second URL and the diff web page dataset.

2. The method of claim 1 wherein the creating of the diff web page dataset further comprises:
determining a longest common string in the word-based suffix tree; and
using the longest common string in the determining of the difference between the first web page dataset and the second web page dataset.

3. The method of claim 2 wherein, prior to creating of the word-based suffix tree, the method further comprises:
removing data from the first web page dataset pertaining to first white space; and
removing data from the second web page dataset pertaining to second white space.

4. The method of claim 1 wherein the first web page dataset is requested by a first user and the second web page dataset is requested by a second user that is different from the first user.

5. The method of claim 1 wherein the diff web page dataset comprises a link to the first web page dataset and also comprises difference data that is based on the difference between the first web page dataset and the second web page dataset.

6. The method of claim 5 further comprising:
receiving a request to reconstruct the second web page dataset;
in response to receiving the request to reconstruct the second web page dataset, retrieving the link to the first web page dataset from the diff web page dataset;
using the retrieved link to retrieve the first web page dataset,
applying the difference data to the retrieved first web page dataset to create a reconstructed second web page dataset; and
providing the reconstructed second web page dataset.

7. The method of claim 1 wherein the diff web page dataset is smaller in data size compared against the second web page dataset.

8. An information handling system comprising:
one or more processors;
a memory coupled to at least one of the processors;
a set of computer program instructions stored in the memory and executed by at least one of the processors in order to perform actions of:
storing a first URL and a corresponding first web page dataset;
receiving a request to store a second URL and a corresponding second web page dataset;
in response to determining that the second URL corresponds to the first URL, creating a diff web page dataset based on a difference between the first web page dataset and the second web page dataset, wherein the creating of the diff web page dataset further comprises:
creating a word-based suffix tree based on the first web page dataset and the second web page dataset; and using the word-based suffix tree in the determining of the difference between the first web page dataset and the second web page dataset; and storing the second URL and the cliff web page dataset.

9. The information handling system of claim 8 wherein the processors perform additional actions comprising:

determining a longest common string in the word-based suffix tree; and using the longest common string in the determining of the difference between the first web page dataset and the second web page dataset.

10. The information handling system of claim 9 wherein, prior to creating of the word-based suffix tree, the processors perform additional actions comprising:

removing data from the first web page dataset pertaining to first white space; and removing data from the second web page dataset pertaining to second white space.

11. The information handling system of claim 8 wherein the first web page dataset is requested by a first user and the second web page dataset is requested by a second user that is different from the first user.

12. The information handling system of claim 8 wherein the diff web page dataset comprises a link to the first web page dataset and also comprises difference data that is based on the difference between the first web page dataset and the second web page dataset.

13. The information handling system of claim 12 wherein the processors perform additional actions comprising:

receiving a request to reconstruct the second web page dataset;

in response to receiving the request to reconstruct the second web page dataset, retrieving the link to the first web page dataset from the diff web page dataset;

using the retrieved link to retrieve the first web page dataset, applying the difference data to the retrieved first web page dataset to create a reconstructed second web page dataset; and providing the reconstructed second web page dataset.

14. The information handling system of claim 8 wherein the diff web page dataset is smaller in data size compared against the second web page dataset.

15. A computer program product stored in a computer readable storage medium, comprising computer program code that, when executed by an information handling system, causes the information handling system to perform actions comprising:

storing a first URL and a corresponding first web page dataset;

receiving a request to store a second URL and a corresponding second web page dataset;

in response to determining that the second URL corresponds to the first URL, creating a diff web page dataset based on a difference between the first web page dataset and the second web page dataset, wherein the creating of the diff web page dataset further comprises:

creating a word-based suffix tree based on the first web page dataset and the second web page dataset; and using the word-based suffix tree in the determining of the difference between the first web page dataset and the second web page dataset; and storing the second URL and the cliff web page dataset.

16. The computer program product of claim 15 wherein the information handling system perform further actions comprising:

determining a longest common string in the word-based suffix tree; and using the longest common string in the determining of the difference between the first web page dataset and the second web page dataset.

17. The computer program product of claim 16 wherein, prior to creating of the word-based suffix tree, the information handling system performs further actions comprising:

removing data from the first web page dataset pertaining to first white space; and removing data from the second web page dataset pertaining to second white space.

18. The computer program product of claim 15 wherein the first web page dataset is requested by a first user and the second web page dataset is requested by a second user that is different from the first user.

19. The computer program product of claim 15 wherein the diff web page dataset comprises a link to the first web page dataset and also comprises difference data that is based on the difference between the first web page dataset and the second web page dataset.

20. The computer program product of claim 19 wherein the information handling system performs further actions comprising:

receiving a request to reconstruct the second web page dataset;

in response to receiving the request to reconstruct the second web page dataset, retrieving the link to the first web page dataset from the diff web page dataset;

using the retrieved link to retrieve the first web page dataset, applying the difference data to the retrieved first web page dataset to create a reconstructed second web page dataset; and providing the reconstructed second web page dataset.

* * * * *